US012774980B2

(12) United States Patent

Kondo et al.

(10) Patent No.: US 12,774,980 B2
(45) Date of Patent: Oct. 27, 2026

(54) GAS SENSOR AND CONCENTRATION MEASUREMENT METHOD USING GAS SENSOR

(71) Applicant: NGK INSULATORS, LTD., Nagoya (JP)

(72) Inventors: Yuichiro Kondo, Obu (JP); Osamu Nakasone, Inabe (JP); Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 733 days.

(21) Appl. No.: 18/187,049

(22) Filed: Mar. 21, 2023

(65) Prior Publication Data

US 2023/0314366 A1 Oct. 5, 2023

(30) Foreign Application Priority Data

Mar. 31, 2022 (JP) ................................ 2022-058985
Oct. 6, 2022 (JP) ................................ 2022-161650

(51) Int. Cl.
*G01N 27/41* (2006.01)
*G01M 15/10* (2006.01)
(Continued)

(52) U.S. Cl.
CPC .......... *G01N 27/41* (2013.01); *G01M 15/102* (2013.01); *G01N 27/27* (2013.01);
(Continued)

(58) Field of Classification Search
CPC ...... G01N 27/27; G01N 27/409; G01N 27/41; G01N 27/406–4065;
(Continued)

(56) References Cited

U.S. PATENT DOCUMENTS

2015/0034484 A1* 2/2015 Nakasone ............ G01N 27/417 204/412
2016/0223487 A1 8/2016 Okamoto et al.
(Continued)

FOREIGN PATENT DOCUMENTS

EP 0 678 740 A1 4/1995
JP 8-271476 A 10/1996
(Continued)

OTHER PUBLICATIONS

Japanese Office Action received in corresponding Japanese Application No. 2022-161650 dated May 12, 2026.

*Primary Examiner* — James Lin
*Assistant Examiner* — Vivian A Tran
(74) *Attorney, Agent, or Firm* — MATTINGLY & MALUR, PC

(57) ABSTRACT

A sub adjustment pump cell pumps out oxygen from a measurement gas introduced into a sub adjustment chamber to the extent that $H_2O$ and $CO_2$ contained in the measurement gas are not decomposed, a first pump cell pumps out oxygen from a first chamber so that substantially all of $H_2O$ and $CO_2$ contained in the measurement gas introduced from the sub adjustment chamber into the first chamber are decomposed, concentrations of $H_2O$ and $CO_2$ are identified from a pump-in current when $H_2$ and CO generated by decomposition are oxidized in the second chamber and the third chamber, and a concentration of oxygen contained in the measurement gas is identified based on a magnitude of a current flowing between a sub adjustment inner electrode and an outer electrode at the time when the sub adjustment pump cell pumps out oxygen from the sub adjustment chamber.

6 Claims, 10 Drawing Sheets

(51) Int. Cl.

| | |
|---|---|
| ***G01N 27/27*** | (2006.01) |
| ***G01N 27/406*** | (2006.01) |
| ***G01N 27/407*** | (2006.01) |
| ***G01N 27/409*** | (2006.01) |
| ***G01N 27/417*** | (2006.01) |
| ***G01N 27/419*** | (2006.01) |
| ***G01N 27/48*** | (2006.01) |

(52) U.S. Cl.
CPC ..... *G01N 27/4065* (2013.01); *G01N 27/4074* (2013.01); *G01N 27/409* (2013.01); *G01N 27/417* (2013.01); *G01N 27/419* (2013.01); *G01N 27/48* (2013.01)

(58) Field of Classification Search
CPC ..... G01N 27/407–4074; G01N 27/417; G01N 27/419; G01N 27/48–49; G01N 33/0004; G01N 33/0009; G01N 33/0027; G01N 33/0031; G01N 33/0036; G01N 33/004; G01M 15/10–104
See application file for complete search history.

(56) References Cited

U.S. PATENT DOCUMENTS

| | | | | |
|---|---|---|---|---|
| 2019/0383766 | A1* | 12/2019 | Nakagaki ........... | G01N 27/4067 |
| 2020/0103368 | A1* | 4/2020 | Nakagaki ........... | G01N 27/4076 |

FOREIGN PATENT DOCUMENTS

| | | | |
|---|---|---|---|
| JP | 11-190721 | A | 7/1999 |
| JP | 2015-31604 | A | 2/2015 |
| JP | 5918177 | B2 | 5/2016 |
| JP | 6469464 | B2 | 2/2019 |
| JP | 2020-091283 | A | 6/2020 |

* cited by examiner

GAS SENSOR AND CONCENTRATION MEASUREMENT METHOD USING GAS SENSOR

CROSS-REFERENCE TO RELATED APPLICATION

The present application claims priority from Japanese applications JP2022-058985, filed on Mar. 31, 2022, and JP2022-161650 filed Oct. 6, 2022, the contents of which are hereby incorporated by reference into this application.

BACKGROUND OF THE INVENTION

Field of the Invention

The present invention relates to a multi-gas sensor capable of sensing a plurality of types of sensing target gas components and measuring concentrations thereof.

Description of the Background Art

In measurement for managing the amount of an emitted exhaust gas from a vehicle, technology of measuring a concentration of carbon dioxide ($CO_2$) has already been known (see Japanese Patent No. 5918177 and Japanese Patent No. 6469464, for example). In each of gas sensors disclosed in Japanese Patent No. 5918177 and Japanese Patent No. 6469464, in addition to a carbon dioxide ($CO_2$) component, a water vapor ($H_2O$) component can be measured in parallel.

Sensors for exhaust gases of vehicles each need to be able to measure a plurality of types of gases for cost reduction and space savings. A gas sensor including a sensor element having four internal spaces and capable of measuring ammonia ($NH_3$) and nitric oxide (NO) in parallel has also been known (see Japanese Patent Application Laid-Open No. 2020-91283, for example).

Japanese Patent No. 5918177 discloses that, in addition to $CO_2$ and $H_2O$, a concentration of oxygen ($O_2$) can indirectly be determined using a plurality of detection current values (pump current values in pump cells). The method, however, has a problem of a large error and poor accuracy as the plurality of detection current values are combined.

SUMMARY

The present invention is directed to a gas sensor, and, in particular, relates to a multi-gas sensor capable of sensing a plurality of types of sensing target gas components and measuring concentrations thereof.

According to the present invention, a gas sensor capable of measuring concentrations of a plurality of sensing target gas components in a measurement gas at least containing water vapor and carbon dioxide includes: a sensor element including a structure formed of an oxygen-ion conductive solid electrolyte; and a controller controlling operation of the gas sensor, wherein the sensor element includes: a gas inlet through which the measurement gas is introduced; a sub adjustment chamber, a first chamber as a main adjustment chamber, a second chamber, and a third chamber communicating sequentially from the gas inlet via different diffusion control parts; a sub adjustment pump cell including a sub adjustment inner electrode disposed to face the sub adjustment chamber, an outer electrode disposed on an outer surface of the sensor element, and a portion of the solid electrolyte present between the sub adjustment inner electrode and the outer electrode; a first pump cell including a first inner electrode disposed to face the first chamber, the outer electrode, and a portion of the solid electrolyte present between the first inner electrode and the outer electrode; a second pump cell including a second inner electrode disposed to face the second chamber, the outer electrode, and a portion of the solid electrolyte present between the second inner electrode and the outer electrode; and a third pump cell including a third inner electrode disposed to face the third chamber, the outer electrode, and a portion of the solid electrolyte present between the third inner electrode and the outer electrode, the sub adjustment pump cell pumps out oxygen from the measurement gas introduced through the gas inlet into the sub adjustment chamber to the extent that water vapor and carbon dioxide contained in the measurement gas are not decomposed, the first pump cell pumps out oxygen from the first chamber so that substantially all of water vapor and carbon dioxide contained in the measurement gas introduced from the sub adjustment chamber into the first chamber are decomposed, the second pump cell pumps in oxygen to the second chamber to selectively oxidize, in the second chamber, hydrogen contained in the measurement gas, which has been generated by decomposition of water vapor and is introduced from the first chamber into the second chamber, the third pump cell pumps in oxygen to the third chamber to oxidize, in the third chamber, carbon monoxide contained in the measurement gas, which has been generated by decomposition of carbon dioxide and is introduced from the second chamber into the third chamber, and the controller includes: a water vapor concentration identification element configured to identify a concentration of water vapor contained in the measurement gas based on a magnitude of a current flowing between the second inner electrode and the outer electrode when the second pump cell pumps in oxygen to the second chamber; a carbon dioxide concentration identification element configured to identify a concentration of carbon dioxide contained in the measurement gas based on a magnitude of a current flowing between the third inner electrode and the outer electrode at the time when the third pump cell pumps in oxygen to the third chamber; and an oxygen concentration identification element configured to identify a concentration of oxygen contained in the measurement gas based on a magnitude of a current flowing between the sub adjustment inner electrode and the outer electrode at the time when the sub adjustment pump cell pumps out oxygen from the sub adjustment chamber.

According to the present invention, the gas sensor capable of measuring the concentrations of water vapor and carbon dioxide can further determine the concentration of oxygen with higher accuracy.

Preferably, for a predetermined time period during first pumping-out operation of pumping out oxygen from the first chamber so that substantially all of water vapor and carbon dioxide contained in the measurement gas introduced from the sub adjustment chamber into the first chamber are decomposed, the first pump cell stops the first pumping-out operation or performs second pumping-out operation of pumping out oxygen from the first chamber to the extent that water vapor and carbon dioxide contained in the measurement gas are not decomposed so as to interrupt reduction of water vapor and carbon dioxide in the first chamber, to thereby emit water vapor generated in the second chamber and carbon dioxide generated in the third chamber outside the sensor element through the first chamber and the sub adjustment chamber.

According to the present invention, reduction in measurement accuracy of the gas sensor due to re-reduction of water vapor and carbon dioxide generated by oxidation of hydrogen and carbon monoxide is suitably suppressed.

It is thus an object of the present invention to provide a gas sensor capable of measuring concentrations of $CO_2$ and $H_2O$, and capable of suitably measuring a concentration of oxygen.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

<Configuration of Gas Sensor>

Figure 1:
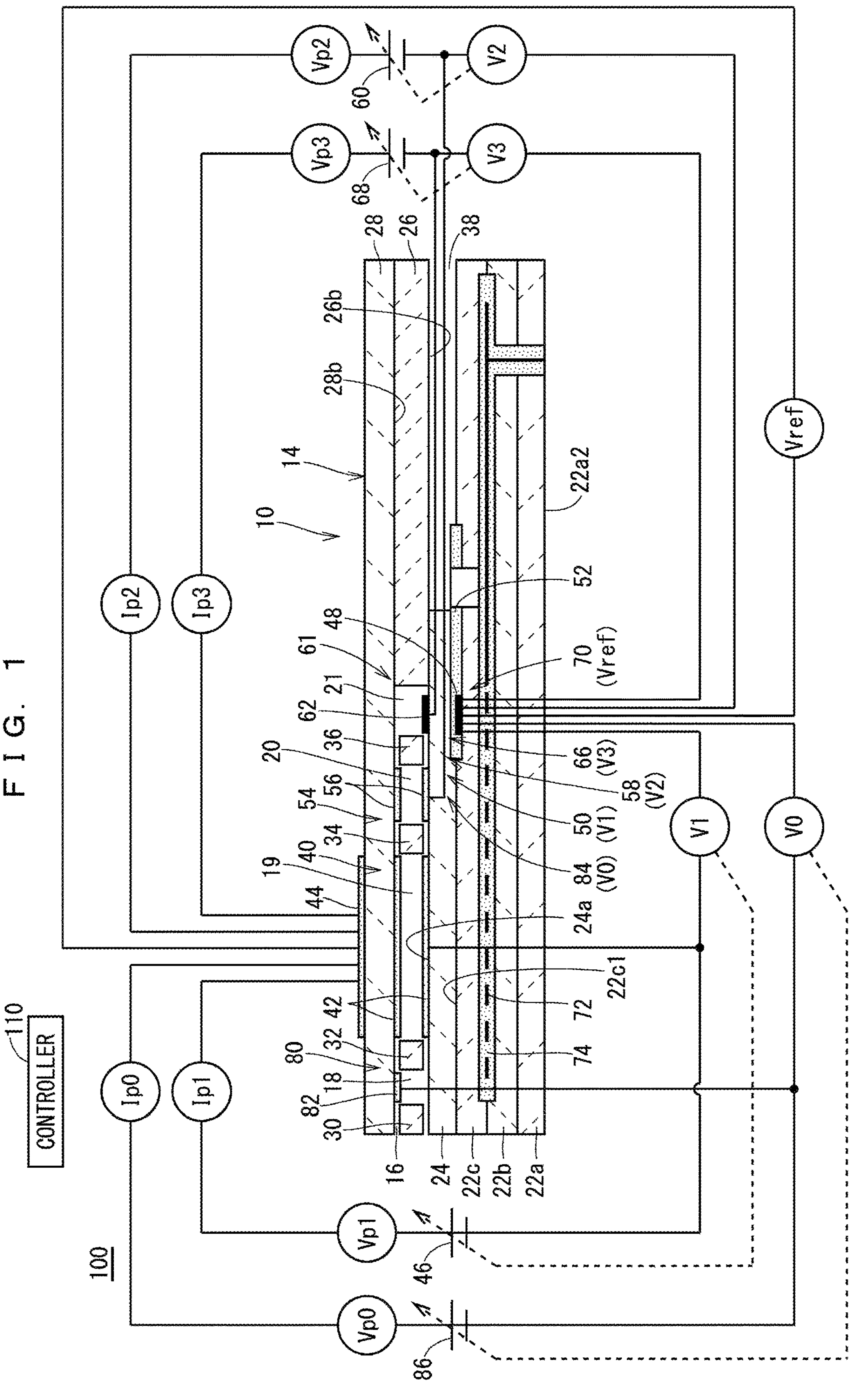
FIG. 1 schematically shows one example of a configuration of a gas sensor 100.

FIG. 1 schematically shows one example of a configuration of a gas sensor 100 according to the present embodiment. The gas sensor 100 is a multi-gas sensor sensing a plurality of types of gas components and measuring concentrations thereof using a sensor element 10. Assume that at least water vapor ($H_2O$) and carbon dioxide ($CO_2$) are main sensing target gas components of the gas sensor 100 in the present embodiment. The gas sensor 100 is attached to an exhaust path of an internal combustion engine, such as an engine of a vehicle, and is used with an exhaust gas flowing along the exhaust path as a measurement gas, for example. FIG. 1 includes a vertical cross-sectional view taken along a longitudinal direction of the sensor element 10.

The sensor element 10 includes an elongated planar structure (base part) 14 formed of an oxygen-ion conductive solid electrolyte, a gas inlet 16 which is located in one end portion (a left end portion in FIG. 1) of the structure 14 and through which the measurement gas is introduced, and a sub adjustment chamber 18, a first chamber (main adjustment chamber) 19, a second chamber 20, and a third chamber 21 located in the structure 14 and communicating sequentially from the gas inlet 16. The sub adjustment chamber 18 communicates with the gas inlet 16 via a first diffusion control part 30. The first (main adjustment) chamber 19 communicates with the sub adjustment chamber 18 via a second diffusion control part 32. The second chamber 20 communicates with the first (main adjustment) chamber 19 via a third diffusion control part 34. The third chamber 21 communicates with the second chamber 20 via a fourth diffusion control part 36.

The structure 14 is formed by laminating a plurality of substrates of ceramics, for example. Specifically, the structure 14 has a configuration in which six layers including a first substrate 22*a*, a second substrate 22*b*, a third substrate 22*c*, a first solid electrolyte layer 24, a spacer layer 26, and a second solid electrolyte layer 28 are sequentially laminated from the bottom. Each layer is formed of an oxygen-ion conductive solid electrolyte, such as zirconia ($ZrO_2$).

The gas inlet 16, the first diffusion control part 30, the sub adjustment chamber 18, the second diffusion control part 32, the first (main adjustment) chamber 19, the third diffusion control part 34, the second chamber 20, the fourth diffusion control part 36, and the third chamber 21 are formed in this order between a lower surface 28*b* of the second solid electrolyte layer 28 and an upper surface 24*a* of the first solid electrolyte layer 24 on a side of the one end portion of the structure 14. A part extending from the gas inlet 16 to the third chamber 21 is also referred to as a gas distribution part.

The gas inlet 16, the sub adjustment chamber 18, the first (main adjustment) chamber 19, the second chamber 20, and the third chamber 21 are formed to penetrate the spacer layer 26 in a thickness direction. The lower surface 28*b* of the second solid electrolyte layer 28 is exposed in upper portions in FIG. 1 of the four chambers, and the upper surface 24*a* of the first solid electrolyte layer 24 is exposed in lower portions in FIG. 1 of the four chambers. Side portions of the four chambers are each defined by the spacer layer 26 or any of the diffusion control parts.

The first diffusion control part 30, the second diffusion control part 32, the third diffusion control part 34, and the fourth diffusion control part 36 each include two horizontally long slits. That is to say, they each have openings elongated in a direction perpendicular to the page of FIG. 1 in an upper portion and a lower portion in FIG. 1 thereof.

The sensor element 10 includes a reference gas introduction space 38 in the other end portion (a right end portion in FIG. 1) opposite the one end portion in which the gas inlet 16 is located. The reference gas introduction space 38 is formed between an upper surface 22*c*1 of the third substrate 22*c* and a lower surface 26*b* of the spacer layer 26. A side portion of the reference gas introduction space 38 is defined by a side surface of the first solid electrolyte layer 24. Oxygen ($O_2$) or air is introduced into the reference gas introduction space 38 as reference gases, for example.

The gas inlet 16 is a part opening to an external space, and the measurement gas is taken from the external space into the sensor element 10 through the gas inlet 16.

The first diffusion control part 30 is a part providing predetermined diffusion resistance to the measurement gas introduced through the gas inlet 16 into the sub adjustment chamber 18.

The sub adjustment chamber 18 is formed as a space to pump out oxygen from the measurement gas introduced through the gas inlet 16 into the sub adjustment chamber 18. Pumping-out of oxygen is implemented by operation of a sub adjustment pump cell 80.

The sub adjustment chamber 18 also functions as a buffer space. That is to say, the sub adjustment chamber 18 also has a function of cancelling concentration fluctuations of the measurement gas caused by pressure fluctuations of the measurement gas in the external space. Pulsation of exhaust pressure of the exhaust gas of the vehicle is taken as an example of such pressure fluctuations of the measurement gas, for example.

The sub adjustment pump cell 80 is an electrochemical pump cell including a sub adjustment inner pump electrode 82, an outer pump electrode 44, and the second solid electrolyte layer 28 sandwiched between these electrodes. The sub adjustment inner pump electrode 82 is disposed on substantially the entire region of the lower surface 28*b* of the second solid electrolyte layer 28 facing the sub adjustment chamber 18, and the outer pump electrode 44 is disposed on one main surface (an upper surface in FIG. 1) of the second solid electrolyte layer 28 to be exposed to the external space.

In the sub adjustment pump cell 80, a voltage Vp0 is applied across the sub adjustment inner pump electrode 82 and the outer pump electrode 44 from a variable power supply 86 disposed outside the sensor element 10 to generate an oxygen pump current (oxygen ion current) Ip0. Oxygen in an atmosphere in the sub adjustment chamber 18 can thereby be pumped out to the external space.

The sub adjustment inner pump electrode 82 and the outer pump electrode 44 are each formed, with platinum (Pt) or an alloy (a Pt—Au alloy) of platinum and gold (Au) as a metal component, as a porous cermet electrode including Pt or the Pt—Au alloy and zirconia ($ZrO_2$) and being rectangular in plan view, for example.

The sensor element 10 also includes a sub adjustment chamber sensor cell 84 as an electrochemical sensor cell to grasp oxygen partial pressure in the atmosphere in the sub adjustment chamber 18. The sub adjustment chamber sensor cell 84 includes the sub adjustment inner pump electrode 82, a reference electrode 48, and a solid electrolyte present in a portion of the structure 14 sandwiched between these electrodes.

The reference electrode 48 is an electrode formed between the first solid electrolyte layer 24 and the third substrate 22*c*, and is formed as a porous cermet electrode including platinum and zirconia and being rectangular in plan view as with the outer pump electrode 44, for example.

A reference gas introduction layer 52 formed of porous alumina and leading to the reference gas introduction space 38 is disposed around the reference electrode 48. A reference gas in the reference gas introduction space 38 is introduced into a surface of the reference electrode 48 via the reference gas introduction layer 52. That is to say, the reference electrode 48 is always in contact with the reference gas.

In the sub adjustment chamber sensor cell 84, electromotive force V0 in accordance with a difference between an oxygen concentration (oxygen partial pressure) in the sub adjustment chamber 18 and an oxygen concentration (oxygen partial pressure) of the reference gas is generated between the sub adjustment inner pump electrode 82 and the reference electrode 48. The oxygen concentration (oxygen partial pressure) of the reference gas is basically constant, so that the electromotive force V0 has a value in accordance with the oxygen concentration (oxygen partial pressure) in the sub adjustment chamber 18.

The second diffusion control part 32 is a part providing predetermined diffusion resistance to the measurement gas which is introduced from the sub adjustment chamber 18 into the first (main adjustment) chamber 19 and from which oxygen has been pumped out.

The first (main adjustment) chamber 19 is formed as a space to reduce (decompose) $H_2O$ and $CO_2$ contained as the sensing target gas components in the measurement gas introduced through the second diffusion control part 32 to generate hydrogen ($H_2$) and carbon monoxide (CO) so that not only oxygen but also $H_2O$ and $CO_2$ are not substantially contained in the measurement gas. Reduction (decomposition) of $H_2O$ and $CO_2$ is implemented by operation of a first (main adjustment) pump cell 40.

The first (main adjustment) pump cell 40 is an electrochemical pump cell including a first (main adjustment) inner pump electrode 42, the outer pump electrode 44, and a solid electrolyte present in a portion of the structure 14 sandwiched between these electrodes.

In the first (main adjustment) pump cell 40, a voltage Vp1 is applied across the first (main adjustment) inner pump electrode 42 and the outer pump electrode 44 from a variable power supply 46 disposed outside the sensor element 10 to generate an oxygen pump current (oxygen ion current) Ip1. Oxygen in the first (main adjustment) chamber 19 can thereby be pumped out.

The first (main adjustment) inner pump electrode 42 is disposed on substantially the entire portions of the upper surface 24*a* of the first solid electrolyte layer 24, the lower surface 28*b* of the second solid electrolyte layer 28, and the side surface of the spacer layer 26 defining the first (main adjustment) chamber 19. Portions of the first (main adjustment) inner pump electrode 42 arranged on these portions are electrically connected to one another. A portion of the first (main adjustment) inner pump electrode 42 disposed on the lower surface 28*b* of the second solid electrolyte layer 28 and the outer pump electrode 44 are preferably arranged on opposite sides of the second solid electrolyte layer 28.

The first (main adjustment) inner pump electrode 42 is formed, with platinum as a metal component, as a porous cermet electrode including platinum and zirconia and being rectangular in plan view, for example.

The sensor element 10 also includes a first (main adjustment) chamber sensor cell 50 as an electrochemical sensor cell to grasp oxygen partial pressure in an atmosphere in the first (main adjustment) chamber 19. The first (main adjustment) chamber sensor cell 50 includes the first (main adjustment) inner pump electrode 42, the reference electrode 48, and a solid electrolyte present in a portion of the structure 14 sandwiched between these electrodes.

In the first (main adjustment) chamber sensor cell 50, electromotive force V1 in accordance with a difference between an oxygen concentration (oxygen partial pressure) in the first (main adjustment) chamber 19 and the oxygen concentration (oxygen partial pressure) of the reference gas is generated between the first (main adjustment) inner pump electrode 42 and the reference electrode 48. The electromotive force V1 has a value in accordance with the oxygen concentration (oxygen partial pressure) in the first (main adjustment) chamber 19.

The third diffusion control part 34 is a part providing predetermined diffusion resistance to the measurement gas introduced from the first (main adjustment) chamber 19 into the second chamber 20, containing $H_2$ and CO, and substantially not containing $H_2O$, $CO_2$, and oxygen.

The second chamber 20 is formed as a space to selectively oxidize, from among $H_2$ and CO contained in the measurement gas introduced through the third diffusion control part 34, only all of $H_2$ to generate $H_2O$ again. Generation of $H_2O$ due to oxidation of $H_2$ is implemented by operation of a second pump cell 54.

The second pump cell 54 is an electrochemical pump cell including a second inner pump electrode 56, the outer pump electrode 44, and a solid electrolyte present in a portion of the structure 14 sandwiched between these electrodes.

In the second pump cell 54, a voltage Vp2 is applied across the second inner pump electrode 56 and the outer pump electrode 44 from a variable power supply 60 disposed outside the sensor element 10 to generate an oxygen pump current (oxygen ion current) Ip2. Oxygen can thereby be pumped in from the external space to the second chamber 20.

The second inner pump electrode 56 is disposed on substantially the entire portions of the upper surface 24*a* of the first solid electrolyte layer 24, the lower surface 28*b* of the second solid electrolyte layer 28, and the side surface of the spacer layer 26 defining the second chamber 20. Portions of the second inner pump electrode 56 arranged on these portions are electrically connected to one another.

The second inner pump electrode 56 is formed, with the Pt—Au alloy as a metal component, as a porous cermet electrode including the Pt—Au alloy and zirconia and being rectangular in plan view, for example.

The sensor element 10 also includes a second chamber sensor cell 58 as an electrochemical sensor cell to grasp oxygen partial pressure in an atmosphere in the second chamber 20. The second chamber sensor cell 58 includes the second inner pump electrode 56, the reference electrode 48, and a solid electrolyte present in a portion of the structure 14 sandwiched between these electrodes.

In the second chamber sensor cell 58, electromotive force V2 in accordance with a difference between an oxygen concentration (oxygen partial pressure) in the second chamber 20 and the oxygen concentration (oxygen partial pressure) of the reference gas is generated between the second inner pump electrode 56 and the reference electrode 48. The electromotive force V2 has a value in accordance with the oxygen concentration (oxygen partial pressure) in the second chamber 20.

The fourth diffusion control part 36 is a part providing predetermined diffusion resistance to the measurement gas introduced from the second chamber 20 into the third chamber 21, containing $H_2O$ and CO, and substantially not containing $CO_2$ and oxygen.

The third chamber 21 is formed as a space to oxidize all of CO contained in the measurement gas introduced through the fourth diffusion control part 36 to generate $CO_2$ again. Generation of $CO_2$ due to oxidation of CO is implemented by operation of a third pump cell 61.

The third pump cell 61 is an electrochemical pump cell including a third inner pump electrode 62, the outer pump electrode 44, and a solid electrolyte present in a portion of the structure 14 sandwiched between these electrodes.

In the third pump cell 61, a voltage Vp3 is applied across the third inner pump electrode 62 and the outer pump electrode 44 from a variable power supply 68 disposed outside the sensor element 10 to generate an oxygen pump current (oxygen ion current) Ip3. Oxygen can thereby be pumped in from the external space to the third chamber 21.

The third inner pump electrode 62 is disposed on substantially the entire portion of the upper surface 24*a* of the first solid electrolyte layer 24 defining the third chamber 21.

The third inner pump electrode 62 is formed, with platinum as a metal component, as a porous cermet electrode including platinum and zirconia and being rectangular in plan view, for example.

The sensor element 10 also includes a third chamber sensor cell 66 as an electrochemical sensor cell to grasp oxygen partial pressure in an atmosphere in the third chamber 21. The third chamber sensor cell 66 includes the third inner pump electrode 62, the reference electrode 48, and a solid electrolyte present in a portion of the structure 14 sandwiched between these electrodes.

In the third chamber sensor cell 66, electromotive force V3 in accordance with a difference between an oxygen concentration (oxygen partial pressure) in the third chamber 21 and the oxygen concentration (oxygen partial pressure) of the reference gas is generated between the third inner pump electrode 62 and the reference electrode 48. The electromotive force V3 has a value in accordance with the oxygen concentration (oxygen partial pressure) in the third chamber 21.

The sensor element 10 further includes an electrochemical sensor cell 70 including the outer pump electrode 44, the reference electrode 48, and a solid electrolyte present in a portion of the structure 14 sandwiched between these electrodes. In the sensor cell 70, electromotive force Vref generated between the outer pump electrode 44 and the reference electrode 48 has a value in accordance with oxygen partial pressure of the measurement gas present outside the sensor element 10.

In addition to the foregoing, the sensor element 10 includes a heater 72 sandwiched between the second substrate 22*b* and the third substrate 22*c* from above and below. The heater 72 generates heat by being powered from outside through an unillustrated heater electrode disposed on a lower surface 22*a*2 of the first substrate 22*a*. The heater 72 is buried over the entire region of a range from the sub adjustment chamber 18 to the third chamber 21, and can heat the sensor element 10 to a predetermined temperature and, further, maintain the temperature. The heater 72 generates heat to enhance oxygen ion conductivity of the solid electrolyte forming the sensor element 10.

A heater insulating layer 74 of alumina and the like is formed above and below the heater 72 to electrically insulate the heater 72 from the second substrate 22*b* and the third substrate 22*c*. The heater 72, the heater electrode, and the heater insulating layer 74 are hereinafter also collectively referred to as a heater part.

The gas sensor 100 further includes a controller 110 performing processing of identifying concentrations of the sensing target gas components based on currents flowing through the sensor element 10 while controlling operation of the sensor element 10.

Figure 2:
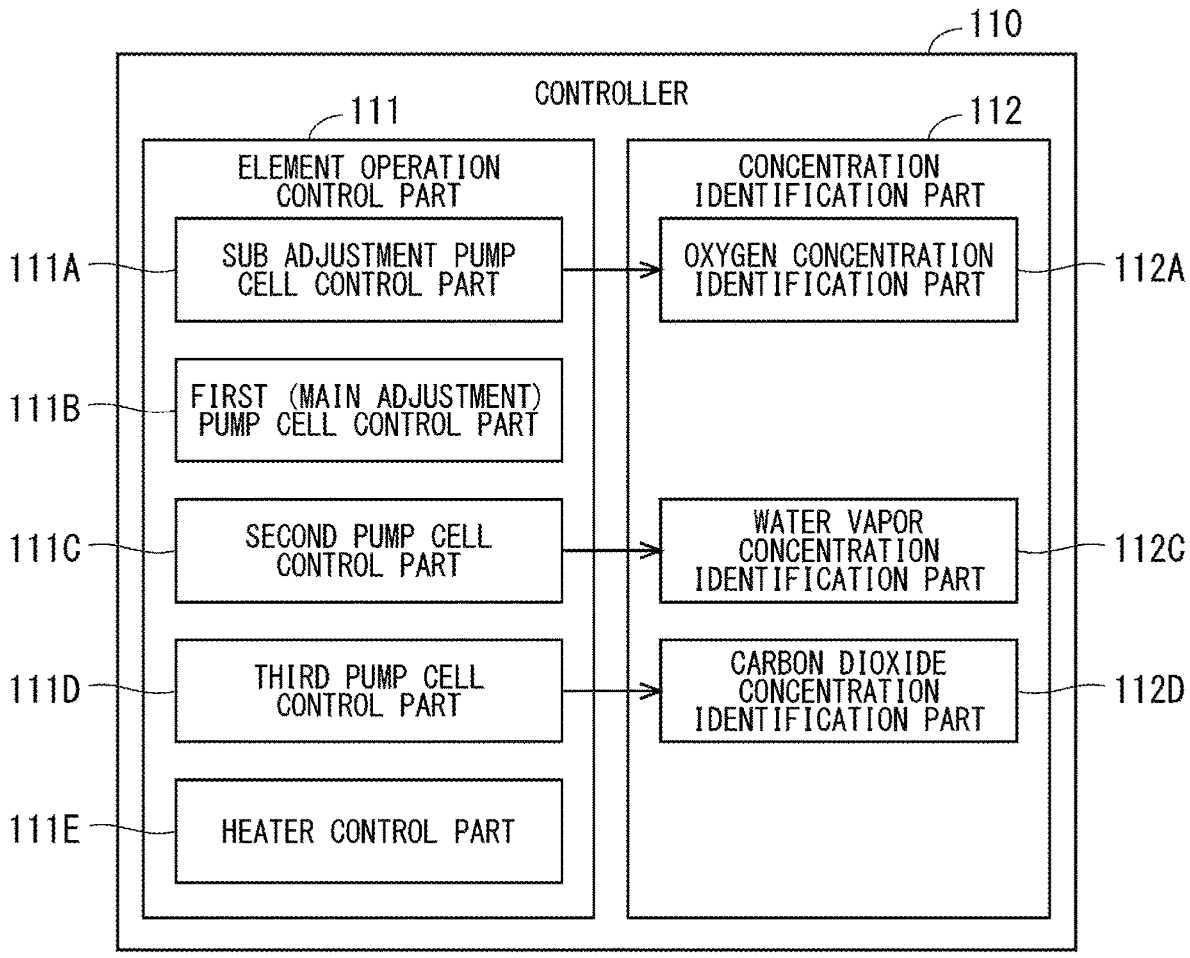
FIG. 2 is a block diagram showing functional components implemented by a controller 110.

FIG. 2 is a block diagram showing functional components implemented by the controller 110. The controller 110 is configured by one or more electronic circuits including one or more central processing units (CPUs), a storage device, and the like, for example. Each of the electronic circuits is a software functional part implementing a predetermined functional component by a CPU executing a predetermined program stored in the storage device, for example. The controller 110 may naturally be configured by an integrated circuit, such as a field-programmable gate array (FPGA), on which a plurality of electronic circuits are connected in accordance with their functions and the like.

In a case where the gas sensor 100 is attached to the exhaust path of the engine of the vehicle, and is used with the exhaust gas flowing along the exhaust path treated as the measurement gas, some or all of the functions of the controller 110 may be implemented by an electronic control unit (ECU) of the vehicle.

The controller 110 includes, as the functional components each implemented by the CPU executing the predetermined program, an element operation control part 111 controlling operation of each part of the sensor element 10 described above and a concentration identification part 112 performing processing of identifying the concentrations of the sensing target gas components contained in the measurement gas.

The element operation control part 111 mainly includes a sub adjustment pump cell control part 111A controlling operation of the sub adjustment pump cell 80, a first (main adjustment) pump cell control part 111B controlling operation of the first (main adjustment) pump cell 40, a second pump cell control part 111C controlling operation of the second pump cell 54, a third pump cell control part 111D controlling operation of the third pump cell 61, and a heater control part 111E controlling operation of the heater 72.

On the other hand, the concentration identification part 112 mainly includes a water vapor concentration identification part 112C and a carbon dioxide concentration identification part 112D respectively identifying a concentration of $H_2O$ and a concentration of $CO_2$ as the main sensing target gas components of the gas sensor 100, and further includes an oxygen concentration identification part 112A identifying a concentration of oxygen contained in the measurement gas. That is to say, the gas sensor 100 according to the present embodiment senses, in addition to $H_2O$ and $CO_2$ as the main sensing target gas components, oxygen as an incidental sensing target gas component, and identifies the concentration thereof. Details thereof will be described below.

<Multi-Gas Sensing and Concentration Identification>

A method of sensing a plurality of types of gases (multi-gas sensing) and identifying concentrations of the sensed gases implemented by the gas sensor 100 having a configuration as described above will be described next. Assume hereinafter that the measurement gas is an exhaust gas containing oxygen, $H_2O$, and $CO_2$.

Figure 3:
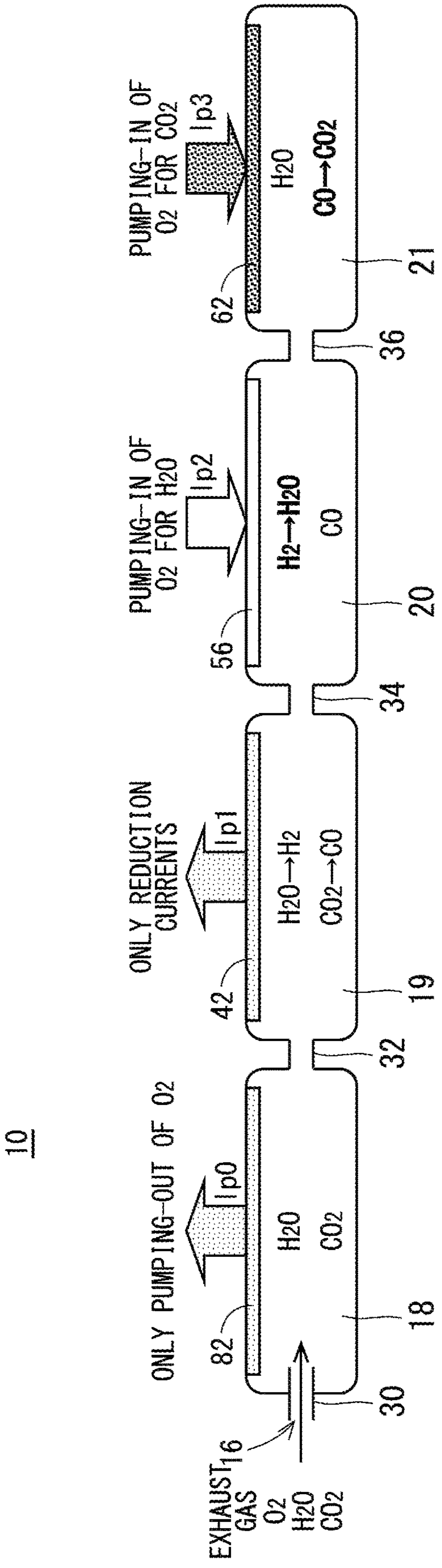
FIG. 3 is a schematic view showing flow of gases to and from four chambers (internal spaces) of a sensor element 10.
Figure 4:
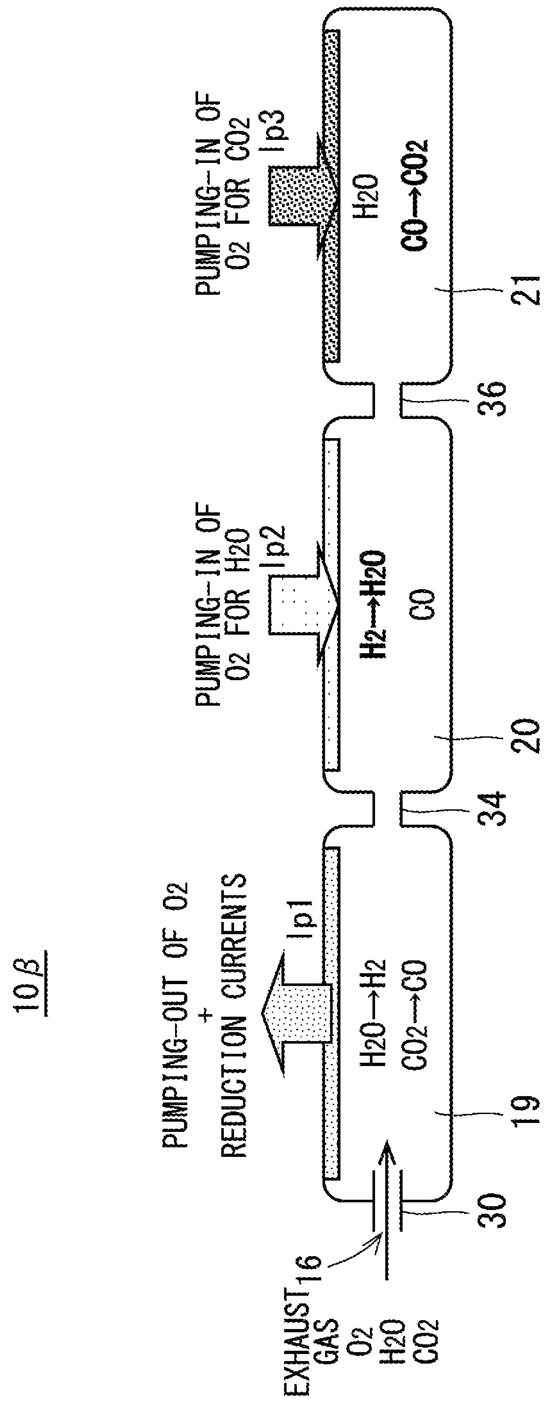
FIG. 4 is a schematic view showing flow of gases to and from three chambers (internal spaces) of a sensor element 10β.

FIG. 3 is a schematic view showing flow of gases to and from the four chambers (internal spaces) of the sensor element 10 of the gas sensor 100. FIG. 4 is a schematic view showing flow of gases to and from three chambers (internal spaces) of a sensor element 10β not including the sub adjustment chamber 18 and the second diffusion control part 32 for comparison. In the sensor element 10β, the gas inlet 16 and the first chamber 19 communicate with each other via the first diffusion control part 30. Furthermore, the sensor element 10β does not include the sub adjustment pump cell 80 and the sub adjustment chamber sensor cell 84 corresponding to the sub adjustment chamber 18, and the sub adjustment pump cell control part 111A and the variable power supply 86 are naturally not required in a gas sensor including the sensor element 10β. The sensor element 10β generally corresponds to a sensor element of a conventional gas sensor having three internal spaces as disclosed in Japanese Patent No. 5918177.

In the sensor element 10 of the gas sensor 100 according to the present embodiment, the measurement gas is first introduced through the gas inlet 16 into the sub adjustment chamber 18 as described above. In the sub adjustment chamber 18, oxygen is pumped out from the introduced measurement gas by operation of the sub adjustment pump cell 80.

Pumping-out of oxygen is performed by the sub adjustment pump cell control part 111A of the controller 110 setting a target value (control voltage) of the electromotive force V0 in the sub adjustment chamber sensor cell 84 to a value (preferably 400 mV) in a range of 400 mV to 700 mV, and performing feedback control on the voltage Vp0 applied from the variable power supply 86 to the sub adjustment pump cell 80 in accordance with a difference between an actual value and the target value of the electromotive force V0 so that the electromotive force V0 is maintained at the target value. For example, a value of the electromotive force V0 significantly deviates from the target value when the measurement gas containing a large amount of oxygen reaches the sub adjustment chamber 18, and thus the sub adjustment pump cell control part 111A controls the pump voltage Vp0 applied from the variable power supply 86 to the sub adjustment pump cell 80 so that the deviation is reduced.

Oxygen is pumped out from the sub adjustment chamber 18 by the sub adjustment pump cell 80 in such a manner, so that oxygen partial pressure in the sub adjustment chamber 18 is maintained at a sufficiently low value to the extent that $H_2O$ and $CO_2$ contained in the measurement gas are not reduced. For example, the oxygen partial pressure is approximately $10^{-8}$ atm when an equation V0=400 mV holds.

Figure 5:
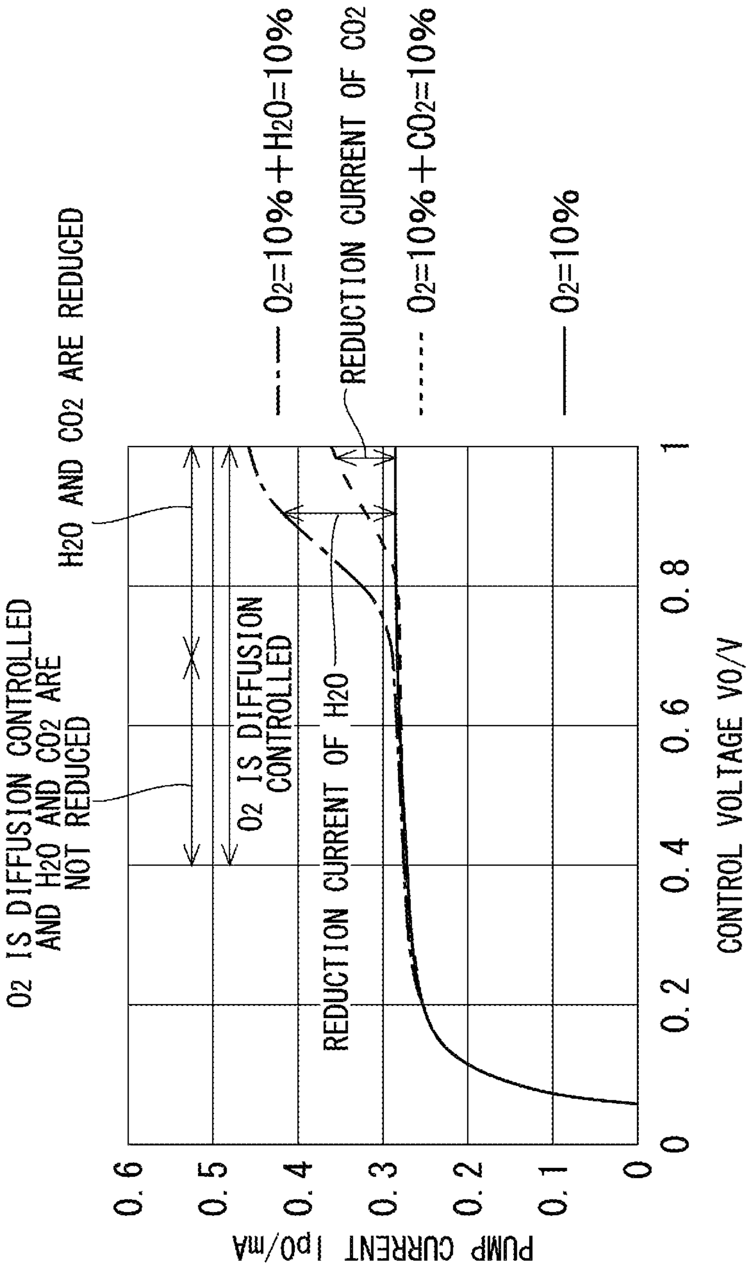
FIG. 5 is a graph showing a relationship between a target value (control voltage) of electromotive force V0 in a sub adjustment chamber sensor cell 84 and an oxygen pump current Ip0 flowing through a sub adjustment pump cell 80 when three different types of model gases are allowed to flow.

FIG. 5 describes a reason why oxygen is pumped out to the extent that $H_2O$ and $CO_2$ are not reduced by setting the target value of the electromotive force V0 to the value in the range of 400 mV to 700 mV. Specifically, FIG. 5 is a graph showing a relationship between the target value (control voltage) of the electromotive force V0 in the sub adjustment chamber sensor cell 84 and the oxygen pump current Ip0 flowing through the sub adjustment pump cell 80 when three different types of model gases are allowed to flow. Specifically, the three types of model gases include a first gas containing oxygen of 10%, a second gas containing oxygen of 10% and $CO_2$ of 10%, and a third gas containing oxygen of 10% and $H_2O$ of 10%. Each of the gases contains nitrogen ($N_2$) as the balance. A temperature of the sensor element 10 is 800° C., and a temperature of each of the model gases is 150° C.

It can be seen from FIG. 5 that the oxygen pump current Ip0 is substantially constant in a range of a control voltage of 0.4 V or more in a case of the first gas, whereas, in a case of the second gas and the third gas, a profile is substantially the same as that in a case of the first gas in a range of a control voltage of 0.7 V or less, but the oxygen pump current Ip0 increases again when the control voltage exceeds 0.7 V. The increase is caused by superposition of reduction currents of $H_2O$ or $CO_2$ flowing due to generation of oxygen caused by reduction (decomposition) of $H_2O$ or $CO_2$ contained in the measurement gas.

In light of the foregoing, the target value of the electromotive force V0 is set to the value in the range of 400 mV to 700 mV in the present embodiment. In terms of securing durability of the electrodes, it is determined that the target value of the electromotive force V0 is preferably 400 mV as the electromotive force V0 is preferably as low as possible.

The measurement gas from which oxygen has been pumped out in the sub adjustment chamber 18 is introduced into the first (main adjustment) chamber 19. In the first (main adjustment) chamber 19, oxygen is further pumped out from the measurement gas introduced after oxygen is pumped out in the sub adjustment chamber 18 by operation of the first (main adjustment) pump cell 40. A reduction (decomposition) reaction ($2H_2O \rightarrow 2H_2+O_2$ and $2CO_2 \rightarrow 2CO+O_2$) of $H_2O$ and $CO_2$ contained in the measurement gas thus progresses, substantially all of $H_2O$ and $CO_2$ are decomposed into hydrogen ($H_2$), carbon monoxide (CO), and oxygen, and oxygen thus generated is pumped out.

Decomposition of $H_2O$ and $CO_2$ and pumping-out of oxygen are performed by the first (main adjustment) pump cell control part 111B of the controller 110 setting a target value (control voltage) of the electromotive force V1 in the first (main adjustment) chamber sensor cell 50 to a value (preferably 1000 mV) in a range of 1000 mV to 1500 mV, and performing feedback control on the voltage Vp1 applied from the variable power supply 46 to the first (main adjustment) pump cell 40 in accordance with a difference between an actual value and the target value of the electromotive force V1 so that the electromotive force V1 is maintained at the target value. The graph of FIG. 5 suggests that the target value of the electromotive force V1 is preferably set to the value in the range of 1000 mV to 1500 mV.

By operation of the first (main adjustment) pump cell 40 in this manner, oxygen partial pressure in the first (main adjustment) chamber 19 is maintained at a value lower than the oxygen partial pressure in the sub adjustment chamber 18. For example, the oxygen partial pressure is approximately $10^{-20}$ atm when an equation V1=1000 mV holds. Thus, the measurement gas substantially does not contain $H_2O$, $CO_2$, and oxygen.

The measurement gas substantially not containing $H_2O$, $CO_2$, and oxygen while containing $H_2$ and CO is introduced into the second chamber 20.

On the other hand, in a case of the sensor element 100 shown in FIG. 4, the measurement gas taken through the gas inlet 16 into the element is introduced into the first chamber 19. In the first chamber 19, decomposition of $H_2O$ and $CO_2$ contained in the introduced measurement gas into hydrogen ($H_2$), carbon monoxide (CO), and oxygen and pumping-out of oxygen are performed together by operation of the first pump cell 40.

This is performed by the first pump cell control part 111B setting the target value (control voltage) of the electromotive force V1 in the first chamber sensor cell 50 to a value in a range of 1000 mV to 1500 mV, and performing feedback control on the voltage Vp1 applied from the variable power supply 46 to the first pump cell 40 in accordance with a difference between an actual value and the target value of the electromotive force V1 so that the target value is achieved. The resultant measurement gas thus substantially does not contain $H_2O$, $CO_2$, and oxygen while containing $H_2$ and CO, as in a case of the sensor element 10. The measurement gas is introduced into the second chamber 20.

Subsequent processing is common between the sensor element 10 and the sensor element 10β. First, in the second chamber 20, oxygen is pumped in by operation of the second pump cell 54, and only $H_2$ contained in the introduced measurement gas is oxidized.

Pumping-in of oxygen is performed by the second pump cell control part 111C of the controller 110 setting a target value (control voltage) of the electromotive force V2 in the second chamber sensor cell 58 to a value (preferably 350 mV) in a range of 250 mV to 450 mV, and performing feedback control on the voltage Vp2 applied from the variable power supply 60 to the second pump cell 54 in accordance with a difference between an actual value and the target value of the electromotive force V2 so that the electromotive force V2 is maintained at the target value.

By operation of the second pump cell 54 in this manner, an oxidation (combustion) reaction $2H_2+O_2 \rightarrow 2H_2O$ is facilitated, and $H_2O$ in an amount correlating with the amount of $H_2O$ introduced through the gas inlet 16 is generated again in the second chamber 20. In the present embodiment, $H_2O$ or $CO_2$ in an amount correlating with the amount of $H_2O$ or $CO_2$ means that the amount of $H_2O$ or $CO_2$ introduced through the gas inlet 16 and the amount of $H_2O$ or $CO_2$ generated again by oxidation of $H_2$ and CO generated by decomposition of $H_2O$ and $CO_2$ are the same, or are within a certain error range allowable in terms of measurement accuracy.

By setting the target value of the electromotive force V2 to the value in the range of 250 mV to 450 mV, oxygen partial pressure in the second chamber 20 is maintained at a value in a range in which almost all of $H_2$ is oxidized but CO is not oxidized. For example, the oxygen partial pressure is approximately $10^{-7}$ atm when an equation V2=350 mV holds.

In this case, the oxygen pump current Ip2 (hereinafter also referred to as a water vapor detection current Ip2) flowing through the second pump cell 54 is substantially proportional to a concentration of $H_2O$ generated by combustion of $H_2$ in the second chamber 20 (there is a linear relationship between the water vapor detection current Ip2 and the concentration of $H_2O$ as generated). The amount of $H_2O$ generated by combustion correlates with the amount of $H_2O$ in the measurement gas decomposed once in the first (main adjustment) chamber 19 after being introduced through the gas inlet 16. $H_2O$ in the measurement gas is thus sensed by the second pump cell control part 111C detecting the water vapor detection current Ip2.

Furthermore, there is a linear relationship between the water vapor detection current Ip2 and a water vapor concentration of the measurement gas. Data (water vapor characteristics data) showing the linear relationship is identified in advance using a model gas having a known water vapor concentration, and is held by the water vapor concentration identification part 112C. In the gas sensor 100 according to the present embodiment, the water vapor concentration identification part 112C acquires a value of the water vapor detection current Ip2 detected by the second pump cell control part 111C. The water vapor concentration identification part 112C identifies a value of the water vapor concentration corresponding to the acquired water vapor detection current Ip2 with reference to the water vapor characteristics data. The water vapor concentration of the measurement gas is thereby identified.

If no $H_2O$ is present in the measurement gas introduced through the gas inlet 16, decomposition of $H_2O$ in the first (main adjustment) chamber 19 is naturally not caused, and thus $H_2$ is not introduced into the second chamber 20, so that the water vapor detection current Ip2 is almost zero.

As a result that $H_2$ is oxidized into $H_2O$, the measurement gas contains $H_2O$ and CO but substantially does not contain $CO_2$ and oxygen. The measurement gas is introduced into the third chamber 21. In the third chamber 21, oxygen is pumped in by operation of the third pump cell 61, and CO contained in the introduced measurement gas is oxidized.

Pumping-in of oxygen is performed by the third pump cell control part 111D of the controller 110 setting a target value (control voltage) of the electromotive force V3 in the third chamber sensor cell 66 to a value (preferably 200 mV) in a range of 100 mV to 300 mV, and performing feedback control on the voltage Vp3 applied from the variable power supply 68 to the third pump cell 61 in accordance with a difference between an actual value and the target value of the electromotive force V3 so that the electromotive force V3 is maintained at the target value.

By operation of the third pump cell 61 in this manner, an oxidation (combustion) reaction $2CO+O_2 \rightarrow 2CO_2$ is facilitated, and $CO_2$ in an amount correlating with the amount of $CO_2$ introduced through the gas inlet 16 is generated again in the third chamber 21.

By setting the target value of the electromotive force V3 to the value in the range of 100 mV to 300 mV, oxygen partial pressure in the third chamber 21 is maintained at a value in a range in which almost all of CO is oxidized. For example, the oxygen partial pressure is approximately $10^{-4}$ atm when an equation V3=200 mV holds.

In this case, the oxygen pump current Ip3 (hereinafter also referred to as a carbon dioxide detection current Ip3) flowing through the third pump cell 61 is substantially proportional to a concentration of $CO_2$ generated by combustion of CO in the third chamber 21 (there is a linear relationship between the carbon dioxide detection current Ip3 and the concentration of $CO_2$ as generated). The amount of $CO_2$ generated by combustion correlates with the amount of $CO_2$ in the measurement gas decomposed once in the first (main adjustment) chamber 19 after being introduced through the gas inlet 16. $CO_2$ in the measurement gas is thus sensed by the third pump cell control part 111D detecting the carbon dioxide detection current Ip3.

Furthermore, there is a linear relationship between the carbon dioxide detection current Ip3 and a carbon dioxide concentration of the measurement gas. Data (carbon dioxide characteristics data) showing the linear relationship is identified in advance using a model gas having a known carbon dioxide concentration, and is held by the carbon dioxide concentration identification part 112D. In the gas sensor 100 according to the present embodiment, the carbon dioxide concentration identification part 112D acquires a value of the carbon dioxide detection current Ip3 detected by the third pump cell control part 111D. The carbon dioxide concentration identification part 112D identifies a value of the carbon dioxide concentration corresponding to the acquired carbon dioxide detection current Ip3 with reference the carbon dioxide characteristics data. The carbon dioxide concentration of the measurement gas is thereby identified.

If no $CO_2$ is present in the measurement gas introduced through the gas inlet 16, decomposition of $CO_2$ in the first (main adjustment) chamber 19 is naturally not caused, and thus CO is not introduced into the third chamber 21, so that the carbon dioxide detection current Ip3 is almost zero.

As described above, the gas sensor including the sensor element 10 and the gas sensor including the sensor element 10β each can suitably identify the water vapor concentration and the carbon dioxide concentration.

In addition, the gas sensor 100 according to the present embodiment can also identify the concentration of oxygen contained in the measurement gas, which takes advantage of the fact that the sensor element 10 further includes the sub adjustment chamber 18 and pumping-out of oxygen and decomposition of $H_2O$ and $CO_2$, which are performed together for the measurement gas introduced into the first (main adjustment) chamber 19 in the sensor element 10β, are performed in stages at two separate locations, that is, in the sub adjustment chamber 18 and in the first (main adjustment) chamber 19.

Specifically, in the gas sensor 100 according to the present embodiment, oxygen is pumped out from the measurement gas introduced through the gas inlet 16 in the sub adjustment chamber 18 as described above. While pumping-out of oxygen is performed by operation of the sub adjustment pump cell 80 to the extent that $H_2O$ and $CO_2$ are not reduced, the oxygen pump current Ip0 (hereinafter also referred to as an oxygen detection current Ip0) flowing through the sub adjustment pump cell 80 at the time is substantially proportional to the concentration of oxygen contained in the measurement gas introduced through the gas inlet 16. That is to say, there is a linear relationship between the oxygen detection current Ip0 and the concentration of oxygen contained in the measurement gas. Data (oxygen characteristics data) showing the linear relationship is identified in advance using a model gas having a known oxygen concentration, and is held by the oxygen concentration identification part 112A. In the gas sensor 100 according to the present embodiment, the oxygen concentration identification part 112A acquires a value of the oxygen detection current Ip0 detected by the sub adjustment pump cell control part 111A. The oxygen concentration identification part 112A identifies a value of the oxygen concentration corresponding to the acquired oxygen detection current Ip0 with reference the oxygen characteristics data. The oxygen concentration of the measurement gas is thereby identified.

For confirmation, in a case of the sensor element 10β shown in FIG. 4, the first pump cell 40 performs pumping-out of oxygen from the first chamber 19 and reduction of $H_2O$ and $CO_2$ by setting the target value (control voltage) of the electromotive force V1 in the first chamber sensor cell 50 to the value in the range of 1000 mV to 1500 mV, but the range of the target value of the electromotive force V1 belongs to a range in which $H_2O$ and $CO_2$ are reduced in the graph shown in FIG. 5, so that the concentration of oxygen contained in the measurement gas introduced through the gas inlet 16 cannot be identified based on the value of the pump current Ip1 flowing through the first pump cell 40 in this case.

In a case of the gas sensor including the sensor element 10β, the concentration of oxygen contained in the measurement gas can indirectly be determined. Generally speaking, a difference value between a concentration (C1) of oxygen pumped out from the first chamber 19 and concentrations (C2 and C3) of oxygen pumped in to the second chamber 20 and the third chamber 21 shown below corresponds to the concentration of oxygen contained in the measurement gas introduced through the gas inlet 16.

$$C=C1-C2-C3 \tag{1}$$

C1, C2, and C3 are values substantially proportional to the oxygen pump current Ip1, the oxygen pump current Ip2, and the oxygen pump current Ip3, respectively, and thus the concentration of oxygen contained in the measurement gas can be determined from detected values of the oxygen pump currents Ip1, Ip2, and Ip3 by identifying relationships (constants of proportionality) between C1 and Ip1, C2 and Ip2, and C3 and Ip3 in advance. The method is hereinafter referred to as a difference method.

The detected values of the oxygen pump currents Ip1, Ip2, and Ip3, however, have measurement errors independently of one another, so that a maximum error in the equation (1) is larger due to the law of propagation of errors.

In contrast, in a case of the gas sensor 100 according to the present embodiment, the oxygen concentration can directly be determined from the value of the oxygen detection current Ip0 by experimentally identifying a constant of proportionality in advance based on the relationship between the oxygen detection current Ip0 and the oxygen concentration substantially proportional to each other. A method of deriving the oxygen concentration that can be performed by the gas sensor 100 according to the present embodiment is hereinafter referred to as a direct method. According to the direct method, the value of the concentration can be determined with higher accuracy than that in a case where the value is determined by the above-mentioned difference method.

As described above, according to the present embodiment, the gas sensor capable of measuring the concentrations of $H_2O$ and $CO_2$ can further determine the oxygen concentration with higher accuracy.

Examples of First Embodiment

Measurement errors of the oxygen concentration in the difference method and the direct method were evaluated.

(Difference Method)

Assume that, as for the oxygen concentrations C1, C2, and C3 and the oxygen pump currents Ip1, Ip2, and Ip3, there are proportional relationships shown below between C1 and Ip1, C2 and Ip2, and C3 and Ip3. The unit of each of the oxygen concentrations C1, C2, and C3 is %, the unit of each of the oxygen pump currents Ip1, Ip2, and Ip3 is mA, and the oxygen pump currents Ip1, Ip2, and Ip3 have positive signs when oxygen is pumped out.

$$C1=19.69Ip1;$$

$$C2=-21.65Ip2; \text{ and}$$

$$C3=-29.53Ip3.$$

The equation (1) is thus expressed as follows:

$$C=19.69Ip1+21.65Ip2+29.53Ip3 \tag{2}$$

The oxygen pump currents Ip1, Ip2, and Ip3 were measured in the gas sensor including the sensor element 100 using a model gas containing oxygen of 10%, $CO_2$ of 10%, and $H_2O$ of 10% and containing nitrogen as the balance as the measurement gas. A temperature of the sensor element was 800° C., and a temperature of the model gas was 150° C.

As a result, values shown below were obtained.

Ip1=2.27 mA;

Ip2=−1.37 mA; and

Ip3=−0.17 mA.

The values of Ip2 and Ip3 have negative signs as the oxygen pump currents have positive signs when oxygen is pumped out.

Assuming that measurement errors of the oxygen pump currents Ip1, Ip2, and Ip3 are each ±1%, ranges of the oxygen pump currents Ip1, Ip2, and Ip3 in view of the measurement errors are as follows:

Ip1=2.27±0.0227 mA;

Ip2=−1.37±0.0137 mA; and

Ip3=−0.17±0.0017 mA.

In light of these ranges, a range of a value of the concentration C including an error obtained from the equation (2) is as follows:

$$C=10\pm0.8(\%)$$

That is to say, the value of the concentration C obtained by the difference method can have an error of up to approximately ±8/100 relative to a median.

(Direct Method)

Assume that there is a proportional relationship shown below between the oxygen concentration C and the oxygen pump current (oxygen detection current) Ip0. The unit of the oxygen concentration C is %, and the unit of the oxygen pump current Ip0 is mA.

$$C=37.04Ip0 \tag{3}$$

The oxygen pump currents Ip0, Ip1, Ip2, and Ip3 were measured in the gas sensor including the sensor element 10 using the model gas containing oxygen of 10%, $CO_2$ of 10%, and $H_2O$ of 10% and containing nitrogen as the balance as the measurement gas as in a case of the difference method. The temperature of the sensor element was 800° C., and the temperature of the model gas was 150° C. As a result, values shown below were obtained.

Ip0=0.27 mA;

Ip1=1.85 mA;

Ip2=−1.24 mA; and

Ip3=−0.15 mA.

Assuming that a measurement error of the oxygen pump current Ip0 is ±1%, a range of the oxygen pump current Ip0 in view of the measurement error is as follows:

Ip0=0.27±0.0027 mA.

In light of the range, a range of a value of the concentration C including an error obtained from the equation (3) is as follows:

$$C=10\pm0.1(\%)$$

That is to say, the value of the concentration C obtained by the direct method can have an error of up to approximately ±1/100 relative to a median.

It can be seen from comparison between the result and the result obtained by the difference method that, in the direct method, the measurement error is suppressed to 1/8 of that in the difference method. The result indicates that the direct method is better than the difference method as a method of identifying the oxygen concentration.

Second Embodiment

<Identification of Concentration in View of Continuous Use>

Figure 6:
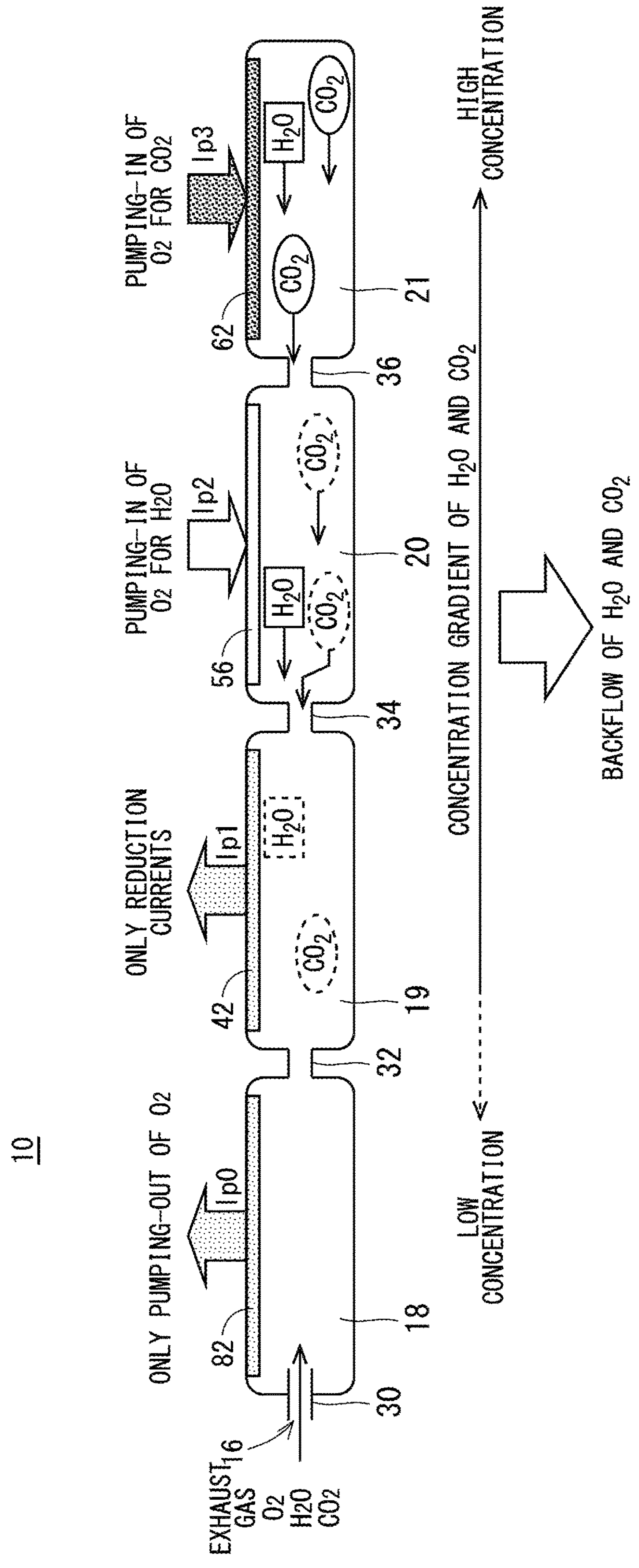
FIG. 6 describes a failure caused when the gas sensor 100 continuously performs measurement based on basic operation.
Figure 7:
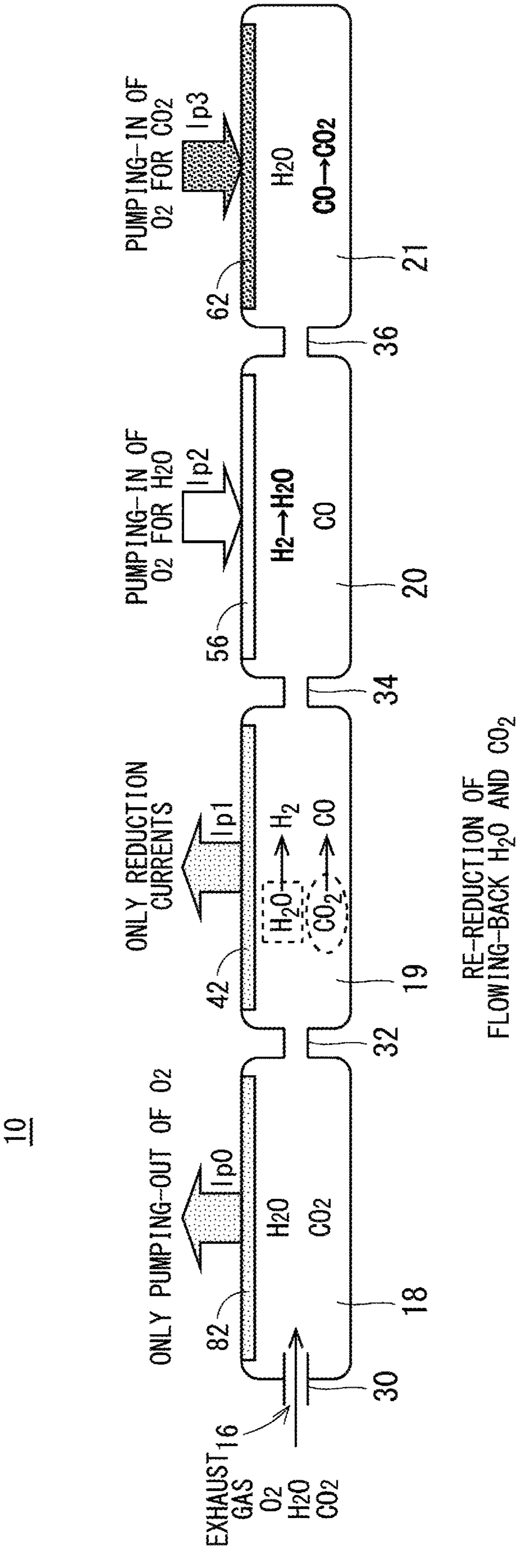
FIG. 7 describes a failure caused when the gas sensor 100 continuously performs measurement based on the basic operation.

A manner of operation of the gas sensor 100 including the sensor element 10 described based on FIG. 3 is hereinafter also referred to as basic operation. FIGS. 6 and 7 describe failures that can be caused when the gas sensor 100 continuously performs measurement based on the basic operation.

When the gas sensor 100 measures the concentrations of $H_2O$ and $CO_2$ and, further, the concentration of oxygen contained in the measurement gas according to the above-mentioned basic operation, $H_2O$ generated in the second chamber 20 is basically introduced into the third chamber 21 or built up in the second chamber 20. $CO_2$ generated in the third chamber 21 is basically built up in the third chamber 21. The amount of $H_2O$ and $CO_2$ generated in the second chamber 20 and the third chamber 21 thus increases as measurement is continuously performed.

Thus, when a concentration of the measurement gas newly introduced through the first diffusion control part 30 (the gas inlet 16) is relatively low, a concentration gradient can be created so that the concentrations of $H_2O$ and $CO_2$ increase with decreasing distance to the third chamber 21 as the farthest internal space from the gas inlet 16 in the gas distribution part extending from the gas inlet 16 to the third chamber 21 as shown in FIG. 6.

As a result of creation of such a concentration gradient, $H_2O$ and $CO_2$ present in the third chamber 21 or the second chamber 20 can diffuse from the third chamber 21 and the second chamber 20 to the first chamber 19. That is to say, $H_2O$ and $CO_2$ can flow back to the first chamber 19.

As described above, in the first chamber 19, reduction of $H_2O$ and $CO_2$ is continuously performed by operation of the first pump cell 40. Thus, when $H_2O$ and $CO_2$ flow back from the third chamber 21 and the second chamber 20, they are reduced (again) into $H_2$ and CO without being distinguished from $H_2O$ and $CO_2$ to be originally measured at the time contained in the measurement gas introduced through the gas inlet 16 as shown in FIG. 7.

Once such re-reduction is performed, $H_2$ to be oxidized by the second pump cell 54 pumping in oxygen to the second chamber 20 includes $H_2$ generated by re-reduction, and CO to be oxidized by the third pump cell 61 pumping in oxygen to the third chamber 21 includes CO generated by re-reduction, so that currents derived from $H_2O$ and $CO_2$ reduced again are superposed onto the water vapor detection current Ip2 flowing through the second pump cell 54 and the carbon dioxide detection current Ip3 flowing through the third pump cell 61. That is to say, the values of the water vapor detection current Ip2 and the carbon dioxide detection current Ip3 fail to correspond to the concentrations of $H_2O$ and $CO_2$ originally contained in the measurement gas, and, as a result, measurement accuracy is reduced.

In the gas sensor 100 according to the present embodiment, operation of each pump cell is controlled so that such reduction in measurement accuracy due to backflow of $H_2O$ and $CO_2$ is not caused. Generally speaking, measurement accuracy is secured not by suppressing backflow of $H_2O$ and $CO_2$ generated in the second chamber 20 and the third chamber 21 but by performing operation of emitting $H_2O$ and $CO_2$ flowing back to the first chamber 19 or, further, to the sub adjustment chamber 18 outside the sensor element 10. The manner of operation is also referred to as generated gas emission operation.

Figure 8A:
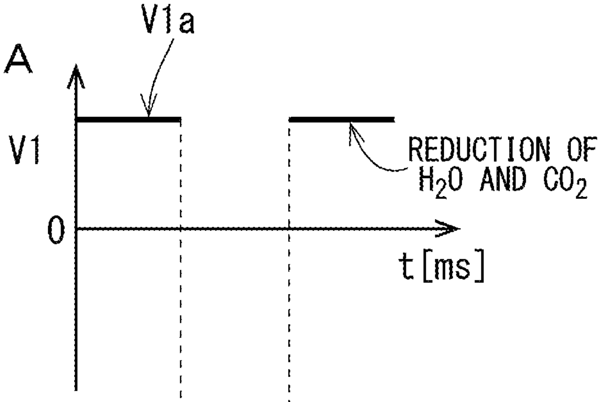
FIGS. 8A and 8B show changes in target values of electromotive force V1, electromotive force V2, and electromotive force V3 over time in generated gas emission operation.
Figure 8B:
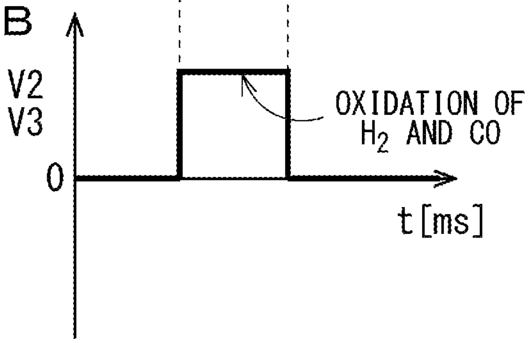
Figure 9:
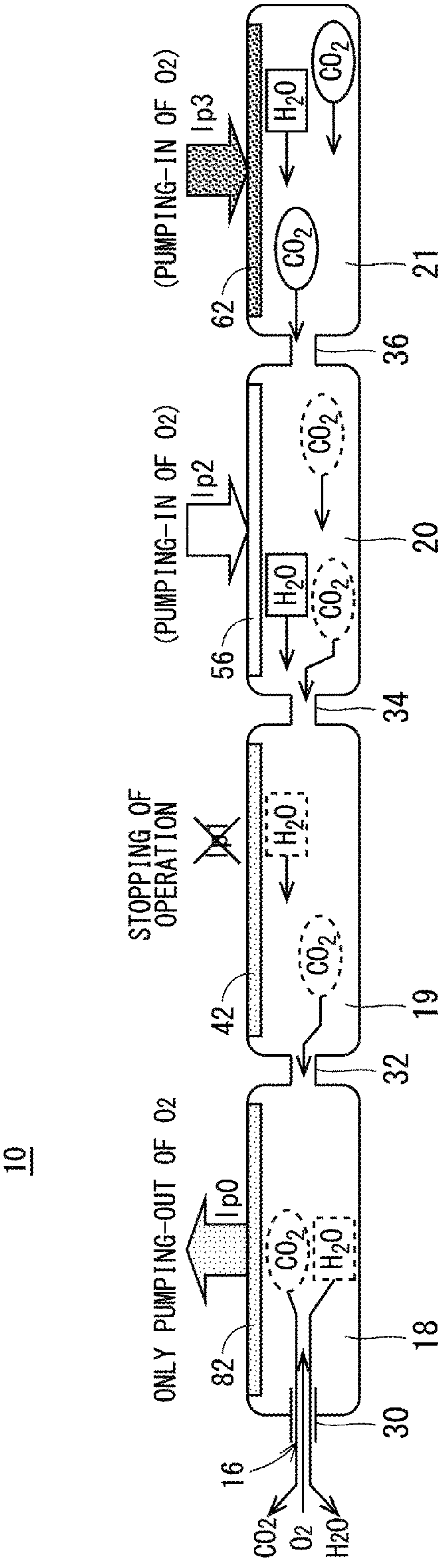
FIG. 9 is a schematic view showing flow of gases to and from the four chambers in the generated gas emission operation.

FIGS. 8A and 8B show changes in target values of the electromotive force V1, the electromotive force V2, and the electromotive force V3 over time in the generated gas emission operation. FIG. 9 is a schematic view showing flow of gases to and from the four chambers (internal spaces) in the generated gas emission operation.

As described above, in the basic operation, the target value of the electromotive force V1 in the first chamber sensor cell 50 is set to the value in the range of 1000 mV to 1500 mV, and feedback control is performed on the voltage Vp1 applied to the first pump cell 40 so that the electromotive force V1 is maintained at the target value.

In contrast, in the generated gas emission operation, operation of the first pump cell 40 is temporarily stopped, so that feedback control to maintain the target value of the electromotive force V1 in the first chamber sensor cell 50 at a predetermined value V1a is temporarily stopped as shown in FIG. 8A.

The value V1a is herein a value in a range of 1000 mV to 1500 mV as with the target value of the electromotive force V1 in the basic operation. The value V1a may be set to the same value as the target value of the electromotive force V1 in the basic operation.

While the target value of the electromotive force V1 is set to the value V1a, the first pump cell 40 pumps out oxygen from the first chamber 19 so that substantially all of $H_2O$ and $CO_2$ contained in the measurement gas are reduced as in the basic operation.

In contrast, when operation of the first pump cell 40 is stopped, reduction of $H_2O$ and $CO_2$ in the first chamber 19 is temporarily interrupted.

That is to say, in the generated gas emission operation, the first pump cell 40 temporarily stops pumping-out operation of pumping out oxygen from the first chamber 19 in which substantially all of water vapor and carbon dioxide contained in the measurement gas are reduced, during the operation.

On the other hand, the target values of the electromotive force V2 and the electromotive force V3 are set similarly to those in the basic operation. Specifically, the target value of the electromotive force V2 is set to the value (preferably 350 mV) in the range of 250 mV to 450 mV, and the target value of the electromotive force V3 is set to the value (preferably 200 mV) in the range of 100 mV to 300 mV.

In this case, although operation of the gas sensor 100 while the target value of the electromotive force V1 is set to the value V1a is the same as the basic operation, $H_2O$ and $CO_2$ contained in the introduced measurement gas are not reduced in the first chamber 19 when operation of the first pump cell 40 is stopped. Thus, even when a concentration gradient as shown in FIG. 6 is created as a result of built-up of $H_2O$ and $CO_2$ generated in the second chamber 20 and the third chamber 21, and $H_2O$ and $CO_2$ flow back to the first chamber 19, flowing-back $H_2O$ and $CO_2$ are emitted outside the element through the sub adjustment chamber 18 as they are as shown in FIG. 9 without being reduced again in the first chamber 19. The concentration gradient is thereby reduced, and, as a result, re-reduction of flowing-back $H_2O$ and $CO_2$ is less likely to be caused when and after the target value of the electromotive force V1 is set to the value V1a again. That is to say, in the gas sensor 100 according to the present embodiment, the first pump cell 40 temporarily stops the pumping-out operation from the first chamber 19 to suitably emit $H_2O$ and $CO_2$ generated by selective oxidation of $H_2$ and CO outside the element through the first chamber 19 and, further, through the sub adjustment chamber 18 in accordance with the concentration gradient created in the gas distribution part in the sensor element 10.

Operation of the first pump cell 40 may be stopped at any timing, or may be stopped at a predetermined timing. Alternatively, operation of the first pump cell 40 may be stopped when a predetermined condition is met. For example, since the amount of $H_2O$ and $CO_2$ generated in the second chamber 20 and the third chamber 21 increases as a situation in which measured values of $H_2O$ and $CO_2$ in the gas sensor 100 are large continues for long time, operation of the first pump cell 40 may be stopped based on integrals of the measured values.

A time period for which operation of the first pump cell 40 is stopped is preferably in a range of 1 ms to 1 s. A set time period of less than 1 ms is not preferable because diffusion of $H_2O$ and $CO_2$ from the second chamber 20 or the third chamber 21 does not sufficiently progress, and thus a situation in which the concentration gradient is not sufficiently reduced and measurement accuracy is still reduced might continue. A set time period of more than 1 s is also not preferable because a time period for which $H_2O$ and $CO_2$ contained in the newly introduced measurement gas cannot be reduced increases, that is, a time period for which measurement of the concentration cannot be performed increases, leading to reduction in responsiveness.

Alternatively, the first pump cell 40 may alternately and periodically perform the pumping-out operation and stop the pumping-out operation to periodically perform temporary stopping of reduction of $H_2O$ and $CO_2$, and the target values (set values) of the electromotive force V2 in the second chamber sensor cell 58 and the electromotive force V3 in the third chamber sensor cell 66 may periodically be changed in synchronization with the periodic change in operation of the first pump cell 40 as shown in FIG. 8B. That is to say, pumping-in of oxygen by the second pump cell 54 and the third pump cell 61 may be performed in synchronization with stopping of operation by the first pump cell 40.

The target values of the electromotive force V2 and the electromotive force V3 are set to zero while the first pump cell 40 operates with the target value of the electromotive force V1 being set to the value V1a, and are set to values in the same ranges as those in the basic operation only when the first pump cell 40 stops operation. The electromotive force V2 and the electromotive force V3 are actually set to different values while they are shown in the same graph in FIG. 8B for ease of illustration.

In this case, reduction of the $H_2O$ and $CO_2$ in the first chamber 19 and selective oxidation of $H_2$ and CO in the second chamber 20 and the third chamber 21 are performed at different timings. That is to say, $H_2O$ and $CO_2$ contained in the introduced measurement gas are not reduced in the first chamber 19 while $H_2$ and CO are oxidized again in the second chamber 20 and the third chamber 21. Also in this case, even when $H_2O$ and $CO_2$ generated in the second chamber 20 and the third chamber 21 are built up to create a concentration gradient as shown in FIG. 6, $H_2O$ and $CO_2$ flowing back to the first chamber 19 are emitted outside the element as they are without being reduced again in the first chamber 19.

In this case, a time period for which the target value of the electromotive force V1 is set to the value V1a is preferably in the range of 1 ms to 1 s.

Figure 10A:
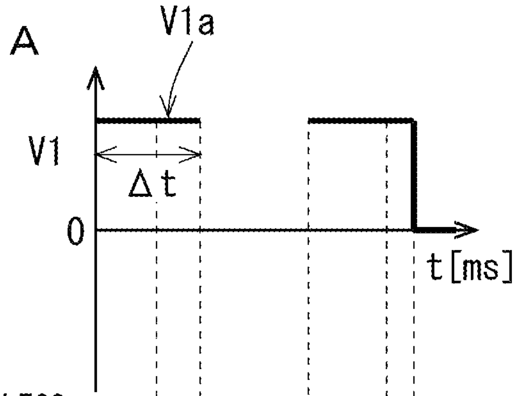
FIGS. 10A and 10B show another example of the generated gas emission operation.
Figure 10B:
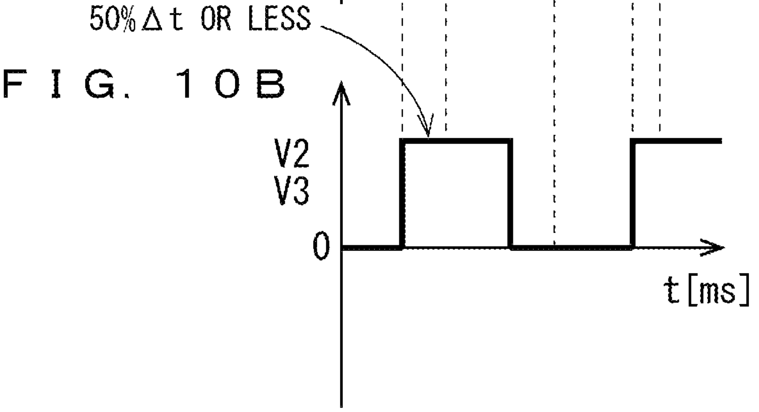

FIGS. 10A and 10B show another example of the generated gas emission operation. In this case, while the periodic change in operation of the first pump cell 40 is similar to that in a case of FIG. 8A as shown in FIG. 10A, the periodic change in target values of the electromotive force V2 and the electromotive force V3 is out of phase (timing) with that in a case of FIG. 8B as shown in FIG. 10B. More specifically, the start of pumping-in of oxygen to the second chamber 20 and the third chamber 21 is moved forward to time during pumping-out operation of the first pump cell 40, and pumping-in ends during stopping of operation of the first pump cell 40. A degree to which the start is moved forward is set to 50% or less of a time period $\Delta t$ for which the first pump cell 40 performs pumping-out operation (a time period for which the target value of the electromotive force V1 is set to the value V1a).

As described above, according to the present embodiment, reduction of $H_2O$ and $CO_2$ in the first chamber is temporarily or periodically stopped in the gas sensor having the four chambers communicating sequentially from the gas inlet as in the gas sensor according to the first embodiment, so that $H_2O$ and $CO_2$ generated by oxidation of $H_2$ and CO are emitted outside the sensor element through the first chamber taking advantage of their concentration gradient. Reduction in measurement accuracy due to re-reduction of $H_2O$ and $CO_2$ generated by oxidation of $H_2$ and CO is thereby suitably suppressed.

Modification of Second Embodiment

Instead of stopping operation of the first pump cell 40 in the generated gas emission operation, feedback control may be performed so that the target value of the electromotive force V1 in the first chamber sensor cell 50 is set to a value equal to or less than the value set as the target value of the electromotive force V0 in the sub adjustment chamber sensor cell 84. In this case, the first pump cell 40 performs pumping-out operation of oxygen present in the first chamber 19 to the extent that $H_2O$ and $CO_2$ contained in the measurement gas are not reduced as with the sub adjustment pump cell 80. Also in this case, $H_2O$ and $CO_2$ built in the second chamber 20 and the third chamber 21 and flowing back to the first chamber 19 are emitted outside the element through the sub adjustment chamber 18 as they are without being reduced again in the first chamber 19.

While the invention has been shown and described in detail, the foregoing description is in all aspects illustrative and not restrictive. It is therefore understood that numerous modifications and variations can be devised without departing from the scope of the invention.

What is claimed is:

1. A gas sensor capable of measuring concentrations of a plurality of sensing target gas components in a measurement gas at least containing water vapor and carbon dioxide, the gas sensor comprising:

a sensor element including a structure formed of an oxygen-ion conductive solid electrolyte; and a controller controlling operation of the gas sensor, wherein the sensor element includes:

a gas inlet through which the measurement gas is introduced;

a sub adjustment chamber, a first chamber as a main adjustment chamber, a second chamber, and a third chamber communicating sequentially from the gas inlet via different diffusion control parts;

a sub adjustment pump cell including a sub adjustment inner electrode disposed to face the sub adjustment chamber, an outer electrode disposed on an outer surface of the sensor element, and a portion of the oxygen-ion conductive solid electrolyte present between the sub adjustment inner electrode and the outer electrode;

a first pump cell including a first inner electrode disposed to face the first chamber, the outer electrode, and a portion of the oxygen-ion conductive solid electrolyte present between the first inner electrode and the outer electrode;

a second pump cell including a second inner electrode disposed to face the second chamber, the outer electrode, and a portion of the oxygen-ion conductive solid electrolyte present between the second inner electrode and the outer electrode; and a third pump cell including a third inner electrode disposed to face the third chamber, the outer electrode, and a portion of the oxygen-ion conductive solid electrolyte present between the third inner electrode and the outer electrode, the sub adjustment pump cell pumps out oxygen from the measurement gas introduced through the gas inlet into the sub adjustment chamber to the extent that the water vapor and the carbon dioxide contained in the measurement gas are not decomposed, the first pump cell pumps out oxygen from the first chamber so that substantially all of the water vapor and the carbon dioxide contained in the measurement gas introduced from the sub adjustment chamber into the first chamber are decomposed, the second pump cell pumps in oxygen to the second chamber to selectively oxidize, in the second chamber, hydrogen contained in the measurement gas, which has been generated by the decomposition of the water vapor and is introduced from the first chamber into the second chamber, the third pump cell pumps in oxygen to the third chamber to oxidize, in the third chamber, carbon monoxide contained in the measurement gas, which has been generated by the decomposition of the carbon dioxide and is introduced from the second chamber into the third chamber, the controller includes:

a water vapor concentration identification element configured to identify a concentration of the water vapor contained in the measurement gas based on a magnitude of a current flowing between the second inner electrode and the outer electrode at the time when the second pump cell pumps in oxygen to the second chamber;

a carbon dioxide concentration identification element configured to identify a concentration of the carbon dioxide contained in the measurement gas based on a magnitude of a current flowing between the third inner electrode and the outer electrode at the time when the third pump cell pumps in oxygen to the third chamber;

an oxygen concentration identification element configured to identify a concentration of the oxygen contained in the measurement gas based on a magnitude of a current flowing between the sub adjustment inner electrode and the outer electrode at the time when the sub adjustment pump cell pumps out the oxygen from the sub adjustment chamber, the sensor element further includes:

a reference electrode being in contact with a reference gas;

a sub adjustment chamber sensor cell which includes the sub adjustment inner electrode, the reference electrode, and a portion of the oxygen-ion conductive solid electrolyte present between the sub adjustment inner electrode and the reference electrode, and in which electromotive force V0 in accordance with the concentration of the oxygen in the sub adjustment chamber is generated between the sub adjustment inner electrode and the reference electrode;

a first chamber sensor cell which includes the first inner electrode, the reference electrode, and a portion of the oxygen-ion conductive solid electrolyte present between the first inner electrode and the reference electrode, and in which electromotive force V1 in accordance with the concentration of the oxygen in the first chamber is generated between the first inner electrode and the reference electrode;

a second chamber sensor cell which includes the second inner electrode, the reference electrode, and a portion of the oxygen-ion conductive solid electrolyte present between the second inner electrode and the reference electrode, and in which electromotive force V2 in accordance with the concentration of the oxygen in the second chamber is generated between the second inner electrode and the reference electrode; and a third chamber sensor cell which includes the third inner electrode, the reference electrode, and a portion of the oxygen-ion conductive solid electrolyte present between the third inner electrode and the reference electrode, and in which electromotive force V3 in accordance with the concentration of the oxygen in the third chamber is generated between the third inner electrode and the reference electrode, and the controller further includes:

a sub adjustment pump cell control element configured to control a voltage applied across the sub adjustment inner electrode and the outer electrode of the sub adjustment pump cell so that the electromotive force V0 in the sub adjustment chamber sensor cell is maintained at a predetermined target value in a range of 400 mV to 700 mV;

a first pump cell control element configured to control a voltage applied across the first inner electrode and the outer electrode of the first pump cell so that the electromotive force V1 in the first chamber sensor cell is maintained at a predetermined target value in a range of 1000 mV to 1500 mV;

a second pump cell control element configured to control a voltage applied across the second inner electrode and the outer electrode of the second pump cell so that the electromotive force V2 in the second chamber sensor cell is maintained at a predetermined target value in a range of 250 mV to 450 mV; and a third pump cell control element configured to control a voltage applied across the third inner electrode and the outer electrode of the third pump cell so that the electromotive force V3 in the third chamber sensor cell is maintained at a predetermined target value in a range of 100 mV to 300 mV.

2. The gas sensor according to claim 1, wherein the sub adjustment pump cell control element controls the voltage applied across the sub adjustment inner electrode and the outer electrode of the sub adjustment pump cell so that the electromotive force V0 is maintained at 400 mV.

3. The gas sensor according to claim 1, wherein for a predetermined time period during a first pumping-out operation, the first pump cell stops the first pumping-out operation or performs a second pumping-out operation so as to interrupt reduction of the water vapor and the carbon dioxide in the first chamber, to thereby emit water vapor generated in the second chamber and carbon dioxide generated in the third chamber outside the sensor element through the first chamber and the sub adjustment chamber, the first pumping-out operation being operation of pumping out the oxygen from the first chamber so that substantially all of the water vapor and the carbon dioxide contained in the measurement gas introduced from the sub adjustment chamber into the first chamber are decomposed, the second pumping-out operation being operation of pumping out the oxygen from the first chamber to the extent that the water vapor and the carbon dioxide contained in the measurement gas are not decomposed.

4. The gas sensor according to claim 3, wherein the first pump cell alternately and periodically performs the first pumping-out operation and either of the stopping of the first pumping-out operation or the performing of the second pumping-out operation, and pumping-in of oxygen to the second chamber by the second pump cell and pumping-in of oxygen to the third chamber by the third pump cell are performed periodically in accordance with operation of the first pump cell.

5. The gas sensor according to claim 4, wherein pumping-in of oxygen to the second chamber by the second pump cell and pumping-in of oxygen to the third chamber by the third pump cell are performed in synchronization with the second pumping-out operation or the stopping of the first pumping-out operation by the first pump cell.

6. The gas sensor according to claim 4, wherein pumping-in of oxygen to the second chamber by the second pump cell and pumping-in of oxygen to the third chamber by the third pump cell are performed from a time during the first pumping-out operation to a time during the stopping of the first pumping-out operation or during the second pumping-out operation by the first pump cell.

* * * * *